Nov. 17, 1942.　　　　L. VAN LOO　　　　2,302,076
DIRIGIBLE VEHICLE LIGHT
Filed Jan. 6, 1941　　　　2 Sheets-Sheet 1

INVENTOR.
Livinus Van Loo
BY
Windsor Davis

Nov. 17, 1942.   L. VAN LOO   2,302,076
DIRIGIBLE VEHICLE LIGHT
Filed Jan. 6, 1941   2 Sheets-Sheet 2

INVENTOR.
Livinus Van Loo
BY
Windsor Davis

Patented Nov. 17, 1942

2,302,076

UNITED STATES PATENT OFFICE 2,302,076

DIRIGIBLE VEHICLE LIGHT

Livinus Van Loo, Detroit, Mich., assignor of one-half to George E. Robinson, Detroit, Mich.

Application January 6, 1941, Serial No. 373,328

3 Claims. (Cl. 240—62.4)

This invention relates to automobile headlights and has for its primary object to provide means for moving the headlights about vertical axes incident to and as a result of turning of the automobile steering wheel so as to direct the headlight beams in the direction the vehicle is turned.

Another object is to provide electrically operated means controlled by movement of the steering wheel shaft for turning the headlights of the automobile as the latter is turned in different directions, said means being so constructed that movement of the headlights is in steps rather than constant. According to this object the headlight moving means is so constructed that the headlights remain stationary in their different selective positions during relatively small steering movements of the steering wheel shaft.

Another object is to provide electrical means of this character embodying in its control circuit a master switch by means of which it may be rendered inoperative and also embodying a retaining means for holding the lights in a straight ahead position when the circuit is rendered operative.

The present light operating means embodies a series of electro-magnets arranged in an arcuate group about a shaft which supports a headlight and coacting with a radial arm on the shaft in such manner that when energized each magnet moves the shaft to a different rotative position. The control circuit includes means for selectively energizing the electro magnets. In this combination, the retaining means which functions when the circuit is inoperative tends to function during the time interval it requires for the switch to move from one contact to another and it is a further object of this invention to provide a latch mechanism operable to prevent the retaining means from functioning while the main switch is closed.

Another object is to provide a device of the character above described capable of alternative use to operate a single headlight, a multiplicity of headlights, or which may be divided in such manner that two head lights are individually and selectively moved in opposite directions from their straight ahead position.

Other objects and advantages will become more fully apparent as reference is made to the accompanying drawings wherein my invention is illustrated, and in which—

Figure 1:
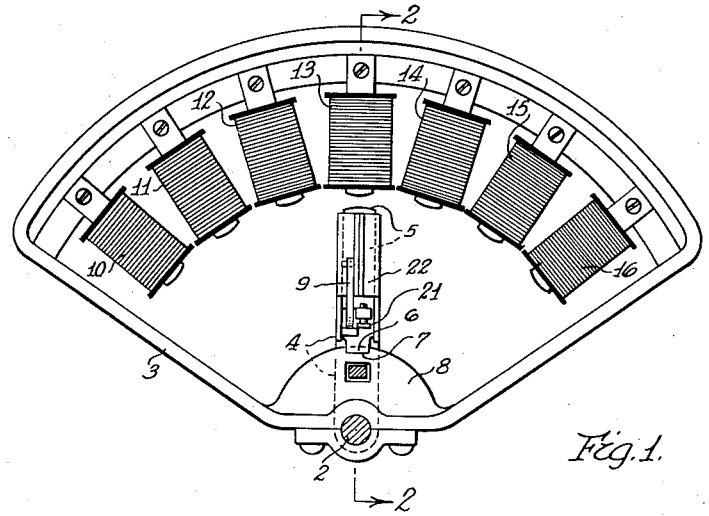
Fig. 1 is a plan view of the operating means, with the cover removed, and staggered below some of the parts of the mechanism as indicated by the section line 1—1 of Fig. 2.

The headlight 1 is mounted upon the upper end of a shaft 2 which is mounted for rotation about a vertical axis in the bracket 3. Fixedly secured to the lower end of the shaft 2 and radiating therefrom is an arm 4 slidably supporting a plunger 5. The plunger 5 has a radially inwardly projecting portion 6, formed of insulation, which is adapted to engage in a notch 7 in an arcuate portion 8 of the bracket 3. A spring 9 normally urges the plunger 5 inwardly so that the projection 6 engages the notch 7 to hold the arm 4 against swinging movement. The notch 7 is so positioned that the arm 4 is held in a position where the headlight 1 is in a straight ahead position.

Arcuately grouped about the shaft 2 are electro magnets 10, 11, 12, 13, 14, 15 and 16 rigidly secured to the bracket 3 with their axes disposed radially with respect to the shaft 2. The magnet 13 when individually energized as hereinafter described magnetically attracts the plunger 5 and causes the projection 6 to be withdrawn from the notch 7 so that the arm 4 becomes free to swing. The other magnets when individually energized also magnetically attract the plunger and in so doing causes swinging movement of the arm 4 into alignment therewith. With the magnets grouped as shown in Fig. 1 the shaft 2 and the lamp carried thereby may be rotatively moved to three positions on each side of the straight ahead position. It will be obvious, however, that the number of magnets may be increased or decreased and may be arranged in different positions according to the requirements of any particular vehicle.

Pivotally mounted on the bracket 3 beneath the arcuate portion 8 is a latch 17 having a portion 18 adapted to be moved into the notch 7 when the latch is swung upwardly. To swing the latch 17 in this manner an electro magnet 20 is mounted on the bracket 3 above the arcuate portion 8 and when energized as hereinafter described magnetically attracts a finger 19 which extends through an opening in the arcuate portion 8. When the projection 6 is withdrawn from the notch 7 and the magnet 20 is subsequently energized the finger 18 closes the notch 7 so that it is impossible for the projection 6 to re-enter the notch when the magnet 13 is subsequently de-energized.

To regulate the extent of movement of the plunger 5 a set screw 21 is mounted thereon for engagement with the portion 22 of the arm 4 in which the plunger slides. The set screw is preferably so positioned that the plunger 3 does not contact any of the magnets.

Figure 2:
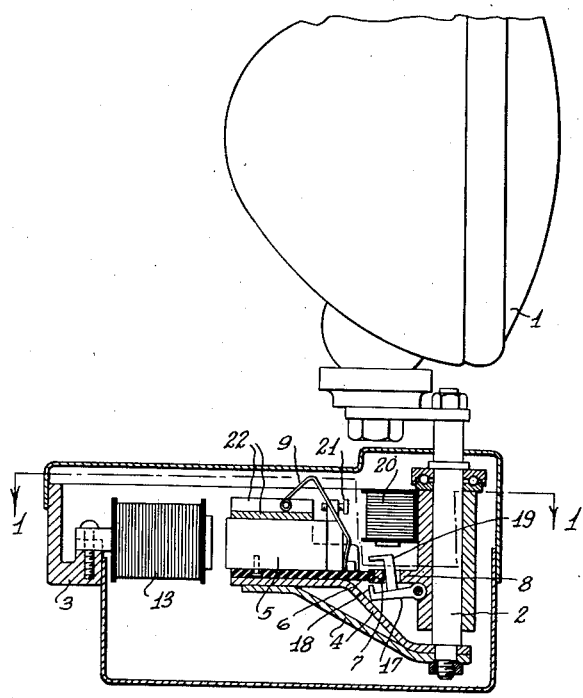
Fig. 2 is a section taken on the line 2—2 of Fig. 1.
Figure 3:
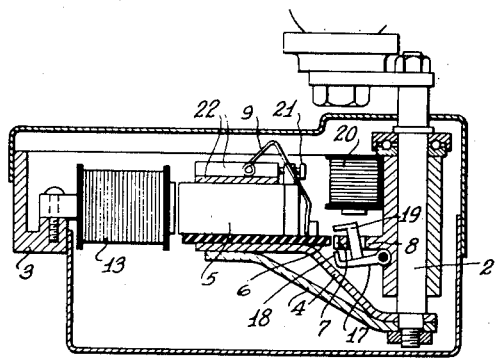
Figs. 3 and 4 are sections similar to Fig. 2, but each illustrating the operating parts in a different position.
Figure 4:
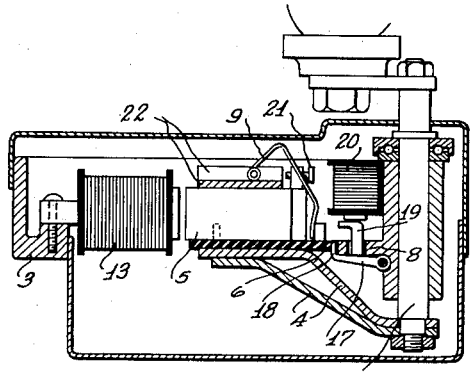

Referring to Fig. 2, the mechanism is shown in an inoperative position, or, in other words, in the straight ahead position it would be in when the control circuit is inoperative. Fig. 3 illustrates the parts in a position caused by energization of the magnet 13, where the plunger 5 has moved radially outwardly and withdrawn the projection 6 from the notch 7. Fig. 4 illustrates the parts in the position caused by energization of the magnet 20 where the projection 6 is prevented from entering the notch 7 even though the magnet 13 is de-energized. With the parts as shown in Fig. 4 the arm 4 may be swung away from the straight ahead position by energization of the magnet 12 or the magnet 14, without interference by the projection 6 engaging the notch before such movement can be started.

It becomes obvious from the foregoing that the purpose of the latch 17, 18 is to prevent locking of the arm 4 against swinging movement every time the magnet 13 is de-energized. When the magnet 12 or 14 is energized the magnet 13 is de-energized and were it not for the presence of the magnet 20 the projection 6 would engage in the notch 7 before the arm 4 could swing into line with either of the magnets 12 or 14.

Figure 5:
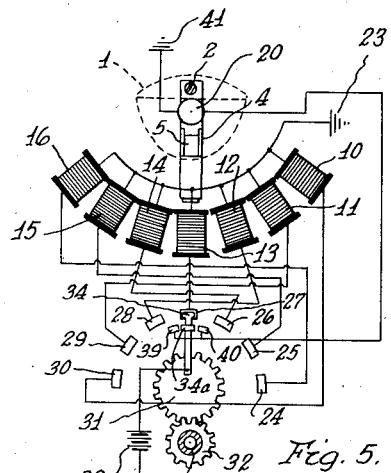
Fig. 5 is a diagram illustrating a control circuit.
Figure 6:
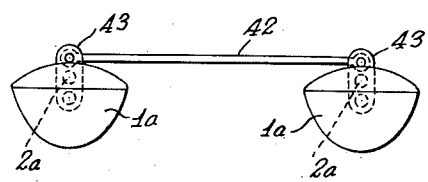
Fig. 6 is a partial plan, illustrating means connecting two headlights for simultaneous movement.
Figure 7:
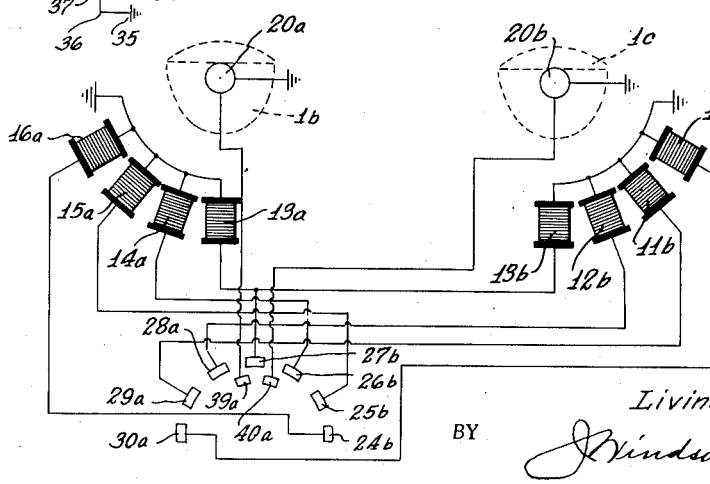
Fig. 7 is a diagram illustrating a modified application of the mechanism and circuit.

The invention contemplates use of a single motivating means for a single lamp as shown in Fig. 5, or a single motivating means for a multiplicity of lamps as shown in Fig. 6, or a divided motivating means in conjunction with two lamps and arranged to move respective lamps in opposite directions from their straight ahead position as shown in Fig. 7.

As shown in Fig. 5 all of the electro magnets 10 to 16 are grounded at 23 and are individually connected to contacts 24, 25, 26, 27, 28, 29 and 30 respectively. The contacts 24 to 30 are arcuately grouped about the axis of a gear 31 which meshes with a gear 32 mounted upon the steering wheel shaft 33 of an automobile. Carried by the gear 31 is a contactor 34 which is adapted to be swung into engagement with respective contacts 24 to 30 by rotative movement of the gear 32 which will be caused by rotative movement of the steering shaft 33. The contactor 34 is connected to a battery 38 which is connected to a ground 35 by a lead wire 36 having a manual master switch 37. Thus when the contactor 34 engages any one of the contacts 24 to 30 the electro magnet 10 to 16 connected to the contact selected is energized.

The contacts 24 to 30 and the contactor 34 are so proportioned and spaced that the contactor 34 may move through a substantial number of degrees while in contact with any of the contacts 24 to 30. This allows for substantial steering movements of the steering wheel shaft 33 without any change taking place in the position of the headlights, thereby permitting the lights to remain stationary during what might be termed small steering movements. In addition, the contacts 24 to 30 are so spaced that no two contacts can be engaged at the same time. This likewise affects the movement of the light in that the arm 4 would be swung into an intermediate position between two simultaneously energized magnets as the contactor engaged the corresponding two contacts (24 to 30).

In addition, the switch mechanism includes two contacts 39 and 40 adapted to be engaged by the contactor portion 34a as the contactor 34 is moved respectively from engagement with the contact 27 to engagement with the contact 28, or from engagement with the contact 27 and into engagement with the contact 26. The contacts 39 and 40 are connected to the magnet 20 which is grounded at 41. Thus the magnet 20 will be energized every time the contactor 34, 34a is moved from the central position shown, or while it is moved through the central position from contact 26 to 28 or vice versa.

In Fig. 6 there are two headlights 1a illustrated as mounted upon shafts 2a. The shafts 2a are connected by a link 42 and radial arms 43 so that both shafts rotate together. By connecting a motivating device such as above described to either of the shafts 2a the two headlights may be caused to move simultaneously.

In Fig. 7 there are two headlights 1b and 1c shown. The light 1c is adapted to be rotated clockwise by magnets 13a, 14a, 15a and 16a, corresponding to the above described magnets 13, 14, 15 and 16 respectively. The lamp 1c is adapted to be moved counterclockwise by magnets 13b, 12b, 11b, and 10b corresponding to the magnets 13, 12, 11 and 10 respectively. The magnets 10b, 11b, 12b and 13b are connected to the contacts 24b, 25b, 26b and 27b corresponding to the contacts 24 to 27 respectively, and the magnets 13a, 14a, 15a and 16a are connected to the contacts 27b, 28a, 29a and 30a corresponding to the contacts 27, 28, 29 and 30 respectively. The two contacts 39a and 40a which correspond to the contacts 39 and 40 are connected to latch operating magnets 20a and 20b adjacent respective lights 1b and 1c.

With an arrangement such as shown in Fig. 7 the left hand headlight will turn to the right as the automobile is turned to the right while the right hand headlight will remain stationary. The right hand headlight will turn to the left when the automobile is turned to the left while the left hand headlight will remain stationary. It will be understood, however, that the arrangement may be reversed merely by using a group of magnets such as shown adjacent the headlight 1c with the headlight 1b, and the group shown with the headlight 1b with the headlight 1c. With the groups of magnets changed in this manner the headlight 1c would turn to the right when the vehicle turned to the right and the headlight 1b would turn to the left when the vehicle turned to the left.

Although specific embodiments of the invention have been illustrated and described, it will be understood that various changes may be made within the scope of the appended claims without departing from the spirit of the invention, and such changes are contemplated.

What is claimed is:

1. In apparatus of the character described, a shaft mounted for rotation about a vertical axis and having a headlight mounted thereon, a radial arm on said shaft, a multiplicity of electromagnets arcuately grouped about said shaft and each when energized adapted to magnetically attract said arm to move said shaft to a different rotative position, a control circuit embodying a switch for selectively energizing said magnets, means for operating said switch including a gear adapted to be connected to the steering wheel shaft of an automobile, a master switch manually operable to render said control circuit inoperative, retaining means for holding said shaft against movement when said circuit is rendered inoperative by opening of said master switch, said retaining means comprising a plunger having limited sliding movement on said arm and a stationary means engaged by said plunger, said plunger being adapted to be moved out of engagement with said stationary means by the magnetic attraction of said magnets, a spring for moving said plunger in a direction toward engagement with said stationary means when said magnets are de-energized, and an electrically operated latch operated by said control switch to prevent engagement between said plunger and said stationary means when said control circuit is closed.

2. In apparatus of the character described, a bracket, a shaft rotatably supported in said bracket and having a headlight mounted thereon, an arm radiating from said shaft and adapted by swinging movement to move said shaft rotatively, said arm having a spring pressed plunger mounted thereon and adapted to engage said bracket to hold said headlight against rotation in a straight ahead position, a multiplicity of electro-magnets arranged in an arcuate group, each of said magnets being adapted individually to attract said plunger and said arm to move said plunger outwardly from the direction of engagement with the bracket and to swing said arm to different positions, circuit means for selectively and individually energizing said magnets, a master control for rendering said circuit means inoperative, and an electrically operated latch operated by said circuit means for positively preventing engagement of said plunger with said bracket while said master control is closed.

3. In apparatus of the character described, a bracket, a shaft rotatably supported in said bracket and having a headlight mounted thereon, an arm radiating from said shaft and adapted by swinging movement to move said shaft rotatively, said arm having a spring pressed plunger mounted thereon and adapted to engage a notch in said bracket to hold said headlight against rotation and in a straight ahead position, a multiplicity of electromagnets arcuately grouped about said shaft and each adapted to attract said arm individually into alignment therewith and to move said plunger in a direction away from engagement with said notch, a circuit means for selectively energizing said magnets, a master control for rendering said circuit means inoperative, a latch adapted to enter said notch to prevent entrance of the plunger thereinto, an electro magnet for moving said latch, and means for energizing said last named electromagnet as said arm is swung toward or away from its straight ahead position by certain of said first named electromagnets.

LIVINUS VAN LOO.